United States Patent
Berner et al.

(10) Patent No.: US 12,234,993 B2
(45) Date of Patent: Feb. 25, 2025

(54) METHOD FOR DETERMINING A PAN POSITION OF A PAN ON A HOB, AND HOB

(71) Applicant: E.G.O. Elektro-Gerätebau GmbH, Oberderdingen (DE)

(72) Inventors: Jonathan Berner, Vaihingen an der Enz (DE); Marcus Frank, Sulzfeld (DE); Marius Lehner, Mühlacker (DE)

(73) Assignee: E.G.O. Elektro-Gerätebau GmbH, Oberderdingen (DE)

( * ) Notice: Subject to any disclaimer, the term of this patent is extended or adjusted under 35 U.S.C. 154(b) by 750 days.

(21) Appl. No.: 17/470,622

(22) Filed: Sep. 9, 2021

(65) Prior Publication Data

US 2022/0099307 A1    Mar. 31, 2022

(30) Foreign Application Priority Data

Sep. 28, 2020 (DE) .......................... 102020212169.9

(51) Int. Cl.
*F24C 15/10* (2006.01)
*H04W 4/029* (2018.01)
*H04W 4/80* (2018.01)

(52) U.S. Cl.
CPC .......... *F24C 15/106* (2013.01); *F24C 15/105* (2013.01); *H04W 4/029* (2018.02); *H04W 4/80* (2018.02)

(58) Field of Classification Search
CPC .............. H05B 6/062; H05B 2213/05; H04W 4/029; H04W 4/80; F24C 15/106; F24C 15/105
See application file for complete search history.

(56) References Cited

U.S. PATENT DOCUMENTS

| | | | |
|---|---|---|---|
| 2004/0016348 A1 * | 1/2004 | Sharpe | A47J 36/321 99/422 |
| 2008/0018484 A1 * | 1/2008 | Sager | G08B 17/10 340/628 |

(Continued)

FOREIGN PATENT DOCUMENTS

| | | | | |
|---|---|---|---|---|
| DE | 102004044395 A1 * | 3/2006 | ................ | F24C 7/08 |
| DE | 102009029250 A1 | 3/2011 | | |

(Continued)

OTHER PUBLICATIONS

German Patent and Trade Mark Office, Office Action received for Application No. DE 102020212169.9, dated Jun. 29, 2021, 4 pages, Germany.

(Continued)

*Primary Examiner* — Thien S Tran
(74) *Attorney, Agent, or Firm* — ALSTON & BIRD LLP

(57) ABSTRACT

A hob has a hob plate for putting a pan having a remote communication device thereon and multiple heating devices under said hob plate, a hob controller and a main communication device having a transmitter and a receiver for communicating with the pan to measure a distance between itself and the remote communication device. Said main communication device belongs to the hob controller and is designed to use a Bluetooth communication protocol and to receive an individual identifier of the remote communication device and to store the latter in the hob controller. The hob and the main communication device are switched on and a pan having a remote communication device is put onto the hob plate, this being detected. The distance between the main communication device and the remote communication device of the pan is then measured, and the pan position of the pan on the hob is thus determined. This pan position is (Continued)

stored along with the individual identifier of the remote communication device in the hob controller.

21 Claims, 5 Drawing Sheets

(56) References Cited

U.S. PATENT DOCUMENTS

| | | | |
|---|---|---|---|
| 2009/0159589 A1* | 6/2009 | Gratz | H05B 3/746 219/445.1 |
| 2015/0156824 A1* | 6/2015 | Viroli | H05B 6/1209 219/621 |
| 2016/0051078 A1* | 2/2016 | Jenkins | F24C 7/08 99/341 |
| 2016/0095169 A1 | 3/2016 | Sanchez | |
| 2017/0150841 A1* | 6/2017 | Johncock | G05B 15/02 |
| 2019/0125120 A1* | 5/2019 | Jenkins | F24C 15/105 |
| 2019/0353527 A1* | 11/2019 | Bassill | G01K 1/026 |
| 2020/0018487 A1* | 1/2020 | Blum | F24C 7/083 |
| 2020/0196399 A1* | 6/2020 | Egenter | H05B 6/065 |

FOREIGN PATENT DOCUMENTS

| | | |
|---|---|---|
| DE | 102018202255 A1 | 8/2019 |
| DE | 102018221521 A1 | 6/2020 |
| DE | 102020201005 A1 | 7/2021 |
| EP | 3001771 A1 | 3/2016 |
| EP | 3396453 A1 | 4/2017 |
| JP | 2010238586 A * | 10/2010 |

OTHER PUBLICATIONS

European Patent Office, Extended European Search Report received for EP Application No. 21194057.2, dated Jan. 31, 2022, 5 pages, Germany.

* cited by examiner

METHOD FOR DETERMINING A PAN POSITION OF A PAN ON A HOB, AND HOB

CROSS REFERENCE TO RELATED APPLICATIONS

This application claims priority to and the benefit of German Patent Application No. 102020212169.9, filed on Sep. 28, 2020, the contents of which as are hereby incorporated by reference in their entirety.

BACKGROUND

Related Field

The invention relates to a method for determining a pan position of a pan on a hob, in particular when the pan is a so-called smart or intelligent pan having an additional module thereon that can detect temperatures and transmit said temperatures to a hob controller. The invention also relates to a corresponding hob.

Description of Related Art

US 2016/095169 A1 discloses a pan that allows a temperature measurement at the pan, possibly also for the purpose of recording other values, in a module. The pan and the module have a type of remote communication device that can communicate or interchange data with a communication device of a hob. Said data include not only an individual identifier for the pan but also the temperature data. An important aspect in this case is the unique detection not just of the individual pan but also of the position thereof on the hob or over a heating device of the hob. It is thus possible to ensure that this specific heating device of the hob is then also actually used to heat this pan, which means that for example automatic cooking programs of the hob can run in a precisely controlled manner.

DE 10 2020 201 005 A1 discloses a method for determining a pan position of such a pan on a hob. In this case, a vibration sensor on the pan detects heating of this pan with an induction heating coil as heating device. Respective different operation of the induction heating coils of the hob produces different patterns of vibrations, which can then be uniquely recognized by a pan having such a vibration sensor that has been placed over a specific induction heating coil. This allows unique determination of the pan position of this pan over a specific induction heating coil.

Yet another similar possibility is known from US 2020/196399 A1. Induction heating coils are likewise actuated with a specific pattern here. However, this serves not to be able to immediately detect the vibrations caused thereby on a pan that has been put on over said induction heating coils, but rather to be able to use a temperature sensor provided on the pan to detect a temperature rise or temperature changes at the pan, which should then match the pattern of the heating power generation.

BRIEF SUMMARY

The invention is based on the object of providing a method mentioned at the outset and a hob mentioned at the outset that allow problems of the prior art to be solved and in particular allow a pan position of a pan having an aforementioned remote communication device on a hob to be detected with certainty and practically.

This object is achieved by a method having the features of claim 1 and by a hob suitable for carrying out this method having the features of claim 21. Advantageous and preferred configurations of the invention are the subject of the further claims and are explained in more detail below. Some of the features are described just for the method or just for the hob. However, regardless of this, they are supposed to be applicable both to the method and to the hob by themselves and independently of one another. The wording of the claims is turned into the content of the description by way of express reference.

The hob has a hob plate for putting the pan or pans on and also multiple heating devices arranged beside one another under the hob plate. There are several options for this, as will be explained in more detail below. Advantageously, induction heating coils are used as heating devices, but this does not necessarily have to be the case. In addition, the hob has a hob controller, a main communication device and advantageously also an operator control device as well. This main communication device has a transmitter and a receiver, which are designed to communicate with a pan having a remote communication device. This advantageously corresponds to a pan from the prior art mentioned at the outset. In addition, the main communication device can measure a distance between itself and the remote communication device, advantageously by means of a type of time-of-flight measurement, which is not imperative, however. The main communication device, like all of the communication devices of the hob, is designed to use a wireless communication protocol or to operate with radio, in particular with Bluetooth, particularly advantageously with BLE. It is also possible to measure by radio using ultra-wideband. Additionally, the main communication device can receive an individual identifier of the remote communication device, that is to say from the pan, and store said individual identifier in the hob controller, or alternatively in a separate memory. All of the remote communication devices of different pans should therefore have different individual identifiers, which is known from the prior art and presents no difficulty. Preferably, the main communication device belongs to the hob controller and/or is controlled by said hob controller. It does not necessarily need to be spatially integrated in the hob controller, on printed circuit boards or in a housing thereof, but it is functionally regarded as part thereof.

The method involves the following steps being performed: the hob and the main communication device have been or are switched on, as has a pan detection device of the hob. A pan having a remote communication device therein or thereon has been placed on the hob plate or is placed thereon, both in particular in any position. The pan is detected as being present or put on the hob plate, for which purpose said pan detection device is advantageously used. This pan detection device will be discussed in more detail below. After the pan has been detected as being present or put on the hob plate, a distance between the main communication device and the remote communication device of the pan is measured. The measured distance between the main communication device and the remote communication device is used to determine the pan position of the pan on the hob. This can be done using various mathematical options and also advantageously additionally with further measurements and/or plausibility checks. The individual identifier of the remote communication device is received by the main communication device and stored together with the determined pan position in the hob controller, or alternatively in the main communication device.

The pan position of the pan having the main communication device is therefore determined essentially and primarily by means of the distance measurement. Further checks or measurements will be described as options below. The method mentioned allows a position of a pan having a remote communication device on the hob to be determined with certainty and reliably and also relatively quickly, in particular in a few seconds or even faster. Although it is generally also possible for a pan position to be detected using the pan detection device, specifically the use of automatic cooking programs for a so-called intelligent pan of this kind having a remote communication device requires the assurance to be provided that an association between the individual identifier of this pan and the pan position is known to the hob controller and guaranteed.

Advantageously, the pan detection device can be integrated in the hob, in particular by means of generally known pan detection sensors, which can operate differently. Particularly advantageously, induction heating coils are used as heating devices for this purpose, which are themselves known to be able to operate as a pan detection device. Although they may not be able to accurately detect an exact pan position to within a few cm, the hob controller can use the distance measurement according to the invention for this purpose. Alternatively, a pan detection device could also be arranged outside the hob, for example by means of external sensors or an external video camera that is arranged above the hob, for example. Wall cabinets and/or an extractor hood are suitable for this purpose.

In one configuration of the invention, there is advantageously provision for the remote communication device on the pan to be at a distance of less than 2 cm, in particular less than 1 cm, from a surface center of a contact surface of the pan on the hob plate in the direction of projection or in a plan view from above. This has the advantage not only of general accurate association of the remote communication device with the pan but also of association for which a rotation or twisted placement of the pan does not have an adverse effect on the pan position or the distance measurement. The remote communication device can be arranged on the pan in a known manner with this proviso, that is to say either in a pan base, which is normally difficult for thermal reasons, or on the pan base or advantageously on a lid for the pan. Even if the lid is actually separate from the pan and can be removed, the combination of pan and lid is regarded as a pan for this invention.

In one development of the invention, there can be provision for a user to start or trigger the determination of a pan position by means of a manual action, for example because he has put such a pan having a remote communication device onto the hob. Alternatively and advantageously, this can be triggered automatically so to speak, for example because the pan detection device has been used to detect a pan as being present or put on. This relieves the user of the effort of starting.

In a first possible configuration of the invention, the heating devices of the hob are at a distance of at least 4 cm from one another. This is thus a conventional hob, so to speak, with separate and distributed heating devices, the heating devices advantageously being designed to heat a pan put on over them as a single heating device. They may be so-called two-circuit heating devices, which can expand, so to speak, in order to be able to heat larger pans too. However, these are then explicitly not intended to be understood to mean so-called surface area hobs having many heating devices provided over a wide area, which usually or even imperatively involve at least two or three heating devices having to heat one pan together because they are so small.

The distance of each center of each heating device from the main communication device is known and stored, advantageously in the hob controller. This distance is different for each heating device, which means that they or their positions can easily be distinguished. Advantageously, this distance differs by at least 2 cm for each heating device, which means that easy distinction is possible even if the distance measurement is not all too accurate. One step then involves the measured distance between the main communication device and the remote communication device being compared with the known distances of the centers of the heating devices from the main communication device. This advantageously also involves computation being used to take account of the circumstance that the distance of the centers of the heating devices from the main communication device runs substantially horizontally and is actually always totally fixed. The distance of the remote communication device from the main communication device actually always runs at an angle or slant, however, and, depending on the height of a pan, the slant and therefore also the distance can vary. Here, there can be provision for each lid having a remote communication device to be able to be used or to be supposed to be used just for precisely one single pan, which means that the height of the remote communication device above the hob plate is known. A numerical value determined thereby can be transmitted from the remote communication device to the hob controller or else may already be contained in the individual identifier in usable form, which means that the hob controller can automatically calculate and correct this disadvantageous influence, so to speak. As such, it is a simple matter to use trigonometric formulae to determine the distance of the center of the pan on the contact surface from the main communication device on the basis of the actual distance of the remote communication device from the main communication device.

The pan is regarded as positioned on that heating device for which the distance between its center and the main communication device has the least difference in relation to the distance between the main communication device and the remote communication device, possibly corrected as described previously. The hob controller then knows that the pan having the specific individual identifier is positioned on precisely this heating device, and can operate it with certainty, advantageously using an aforementioned automatic program with temperature control. The temperature signals thus relate to a pan on precisely this heating device.

The hob can have four, six or eight such heating devices. They can particularly advantageously be of identical size and/or be in identical form, and can also have different sizes when in identical form, as is known from conventional hobs for heating pans of different size in each case.

This first configuration of the invention advantageously involves the determination of the pan position being possible and performed only if just a single pan having a remote communication device is positioned on the entire hob. In one advantageous configuration, it is performed only if just a single pan, even, is positioned on the hob, this being able to be detected by means of the pan detection device. The reason is that it is then not possible for the single distance measurement to be interfered with by other pans that have been put on. Once the pan position and assignment of the pan position along with an individual identifier have been obtained, other pans without a remote communication device can also be put onto the hob and heated there. The distance measurement then does not need to be repeated again, in particular so long as the pan having the remote communication device is not removed from the heating device for too long.

In a variant of this first configuration of the invention, there can be provision for a specific predefined starting position, in particular a single starting position, to be provided on the hob plate for a pan that is to be put on and is supposed to be detected. The reason is that the pan position together with the reception of a specific individual identifier of this pan or the remote communication device thereof can then be compared with the known starting position or the distance thereof. It is thus very easy for the hob controller, on receiving a specific individual identifier of a pan or its remote communication device, to use the distance measurement to check whether said pan is at the specific predefined starting position. This can then be stored by the hob controller as a temporary pan position together with the individual identifier. There does not yet have to be provision for heating or a heating device at the starting position, in particular there is none. The reason is that the pan, after being detected, can then be moved from the starting position to a position that the user desires over a heating device. This can be detected by the respective pan detection device and checked in respect of a temporal context, in particular within less than 3 sec or less than 5 sec. A distance measurement can then also be used to verify this, in which case the distance measurement does not need to be very accurate. Essentially, said distance measurement can be checked to determine that the result of the distance measurement for the presumed new position of this pan is not significantly inconsistent. There is then provision here for the distance measurement at the second final pan position as a plausibility check.

In this first configuration of the invention, it is then possible for, after this first pan, a second pan having a remote communication device to be detected in the same way, beginning with it being put on in the starting position. The starting position can and should be chosen such that the distance measurement therefrom cannot be distorted or hampered by pans that have already been put on as directed.

In a second configuration of the invention, multiple additional communication devices are arranged in the hob under the hob plate, in particular similarly to the main communication device. These further additional communication devices are designed to measure distance in the same way as the main communication device. They can also be designed to communicate with a remote communication device, for example to receive signals or the individual identifier thereof. This is regarded as less advantageous, however; the main communication device should actually communicate or interchange data with the remote communication devices, advantageously only the main communication device. The additional communication devices are then used or designed only for distance measurement. The design of such a hob thus differs significantly from that of the first embodiment of the invention. It is therefore possible to determine the distance of the remote communication device at the pan position from the main communication device and additionally from at least one additional communication device, in particular additionally from multiple or all additional communication devices. The pan position on the hob plate can then be calculated from these multiple distances given the known position of the main and additional communication devices in the hob. This can in turn also involve a mathematical correction of the height in the vertical direction of the remote communication device being carried out, as described previously. Here, the technical complexity for the hob is thus somewhat higher, precisely because it is also necessary for the additional communication devices to be provided and installed and also connected and actuated. Certainty for the detection of a pan position can be higher, however, and said pan position can be detected with greater certainty.

In one development of this configuration, at least two, preferably at least three, additional communication devices are arranged in the hob. The pan position can be determined on the basis of the distance measurements by means of triangulation or trigonometry. In this case, there can also be provision for specific communication devices to be excluded from a distance measurement on the basis of known pans that have been put on heating devices, this being able to be detected by means of a pan detection device, since it is known and obvious that there is a pan in the way here. In this respect, it can be of particular advantage if the hob housing is square and the communication devices, advantageously all of the communication devices of the hob, are at a distance of less than 5 cm or less than 2 cm from the corners of the hob housing. It can then normally be assumed that at least two communication devices can carry out an unblocked or unhampered and therefore undistorted distance measurement for a remote communication device. Alternatively, the communication devices could be arranged at the centers of the longitudinal sides of the square hob housing, since they can then carry out better, so to speak, distance measurement for being free from obstructions.

In a further configuration of the invention, the main communication device, preferably also at least one of the additional communication devices, can be designed to ascertain a direction or an angle of a signal from the remote communication device of the pan in relation to the main communication device. This is a so-called angle-of-arrival technology, which means that if the main communication device or the additional communication device is in a fixed arrangement then it is possible to determine the angle at which a straight signal line from the remote communication device to the main communication device or the additional communication device runs. Together with the aforementioned distance measurement, it is then possible to use geometry to calculate precisely where the remote communication device and therefore the associated pan has been put onto the hob plate. This can be done either just using the main communication device or, for certainty, also using an additional communication device as well if one is present, naturally with a different angle or a different signal line from the remote communication device.

In yet another configuration of the invention, the main communication device can be designed to use one or more antennas that it has to address the remote communication device on a pan on the hob plate in a predefined spatial direction. This is done in a predefined period at a variable signal strength. It is thus possible, in a similar manner to that described previously, to determine the angle of a straight signal line from the remote communication device to the main communication device or the additional communication device. As such, an applicable spatial direction can be scanned according to the use of one of the antennas. The variable signal strength allows a distinction to be made between the individual antennas. As such, again together with the aforementioned distance measurement, it is possible to use geometry to calculate precisely where the remote communication device or the associated pan has been put onto the hob plate.

Here, it is then possible for multiple pans each having a remote communication device to be positioned on the hob plate and to be able to be put on at the same time, so to speak. The pan positions thereof are then advantageously determined in succession. The order can be arbitrary; it may also be possible to begin with the pan that has been detected as being present or put onto the hob plate first or whose individual identifier has been received by the main communication device first.

In one advantageous development, there can be provision for, during the determination of the pan position of a specific pan having a remote communication device, the other remote communication devices of the other pans not to participate in the distance measurement. They can thus be processed sequentially.

Advantageously, the invention can have provision for the individual identifier of a pan not only to be transmitted more frequently or at recurring intervals but also to be already included in a mentioned time-of-flight measurement for the distance measurement. A distance measurement that is again more certain can then be performed. The reason is that there is always a guarantee of which signal comes from which pan for a distance measurement.

In a further development of the invention, there can be provision for a further step to involve a heating device over which the pan has been detected or has been determined to be positioned producing a specific pattern of heating power as a type of plausibility check. The time and/or the level of the heating power can vary in this pattern. This pattern is then compared with a temperature measurement at the pan. If the pattern of the temperature detection at the pan does not match the pattern of the production of heating power for the heating device over which the pan has been assumed or determined to be positioned, there is an error, so to speak. The pan position of this pan is then assumed to be unknown; automatic programs that are possibly running are stopped. If necessary a user is informed about this error and is asked to determine the pan position again. Such a safety check or plausibility check, which naturally takes a little longer time, for example up to 1 min or up to 3 min, can rule out an additional source of error from an incorrect positioning. In itself, such a method is known from the prior art cited at the outset, of course, and it is used here just for the purpose of improved plausibility checking.

These and other features emerge not only from the claims but also from the description and the drawings, wherein the individual features can be realized in each case by themselves or as a plurality in the form of subcombinations in an embodiment of the invention and in other fields and can constitute advantageous and inherently protectable embodiments for which protection is claimed here. The subdivision of the application into individual sections and sub-headings do not restrict the general validity of the statements made thereunder.

BRIEF DESCRIPTION OF THE FIGURES

Further advantages and aspects of the invention emerge from the claims and from the description of exemplary embodiments of the invention, which are explained below with reference to the figures, in which:

DETAILED DESCRIPTION OF VARIOUS EMBODIMENTS

Figure 1:
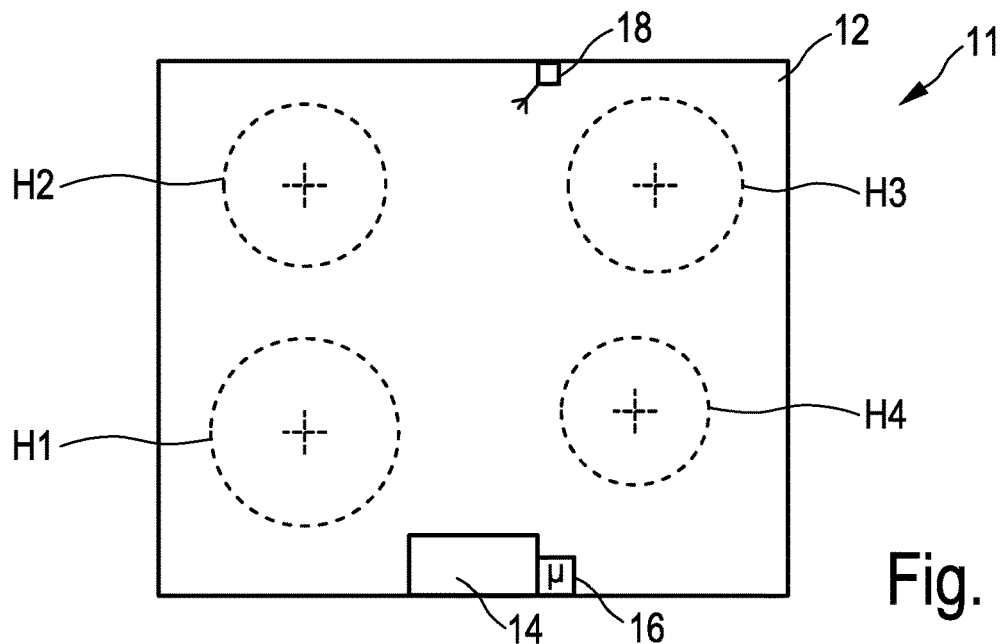
FIG. 1 shows a plan view of a hob according to a first configuration of the invention.

FIG. 1 depicts a hob 11 with a hob plate 12 in a first configuration of the invention, as has been explained previously. The hob 11 has four induction heating coils H1, H2, H3, H4 below the hob plate 12, which are in a distributed arrangement. They can be of different size; alternatively, they can also be of identical size. Their distance from one another is relatively distinct; advantageously, it is at least 4 cm. Four dashes like a cross also each depict the centers of the induction heating coils H1 to H4, which in practice do not need to be marked on the hob plate 12, however. Advantageously, however, there can be provision for a ring marking thereon according to the size of the respective induction heating coil H1 to H4, as is known from hobs. These induction heating coils H1 to H4 are also simultaneously provided, as is known, with a pan detection function, which means that they form the pan detection device mentioned at the outset.

In the front area, the hob 11 has an operator control device 14, advantageously with touch switches and an indicator or an indicator display. The operator control device 14 has a hob controller 16 connected to it, which has a microcontroller. This hob controller 16, together with the induction heating coils H1 to H4, forms the mentioned pan detection device.

Arranged in the rear area of the hob 11 is a main connector 18, specifically below the hob plate 12, advantageously inside an ordinary hob housing situated beneath. The position of the main connector 18 is chosen arbitrarily, as will become clear from the description of FIG. 3 below. This main connector 18 is the main communication device explained previously. It has a transmitter and a receiver, which can advantageously operate using a wireless or Bluetooth communication protocol or, better still, using a BLE communication protocol, and therefore transmit and receive according to the BLE standard. In particular, the main connector 18 is designed to measure a distance, which will be explained in more detail below.

Figure 2:
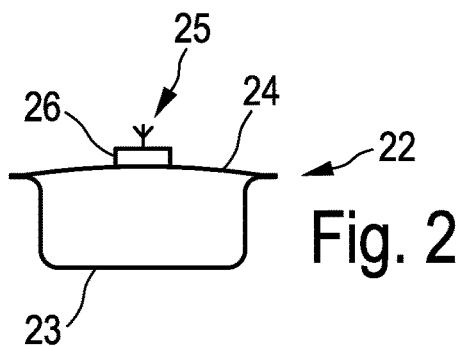
FIG. 2 shows a pan used for the method according to the invention, with an attachment module on a pan lid.

FIG. 2 depicts a pan 22 with a pan base 23, the surface of which forms its contact surface mentioned at the outset. This surface is advantageously round. The pan 22 has a lid 24, which, centrally, has a remote communication device 25 integrated in an attachment module 26. The symbolic antenna of the remote communication device 25 is not present in practice.

The pan 22 with the attachment module 26 is a so-called smart or intelligent pan, as is known from the aforementioned US 2016/095169 A1, for example. This is because the attachment module 26 has not only the remote communication device 25 but also a power supply, a separate small controller or separate microcontroller and, by way of example, a temperature sensor and/or a pressure sensor. The two sensors monitor the inside of the pan 22, the temperature sensor being designed to detect the temperature of a product being cooked in the pan 22. Cooking processes can therefore be controlled using automatic programs, as is known from the prior art. These automatic programs are executed in the hob controller 16 and use the data from the sensors of the attachment module 26, in particular temperature data from a temperature sensor. Depending on the desired temperature, the hob controller 16 can then appropriately actuate the induction heating coil H1 to H4 over which the pan 22 has been put on. The remote communication device 25 also operates using the same communication protocol as the main connector 18, that is to say advantageously BLE.

For clarification purposes, above the hob 11, FIG. 3 again depicts the distances D1 to D4 between the centers of the induction heating coils H1 to H4, marked in dashes by a cross, and the main connector 18. In the projection from above, these are straight lines, the gradation of the distances D1 to D4 in relation to one another being relatively distinct and therefore rendering them clearly distinguishable. For a normal width of the hob 11 of 60 cm, the distance D1 is approximately 40 cm, and the gradation between the individual distances is then approximately 8 cm, which means that the distance D3 is still approximately 16 cm.

Figure 4:
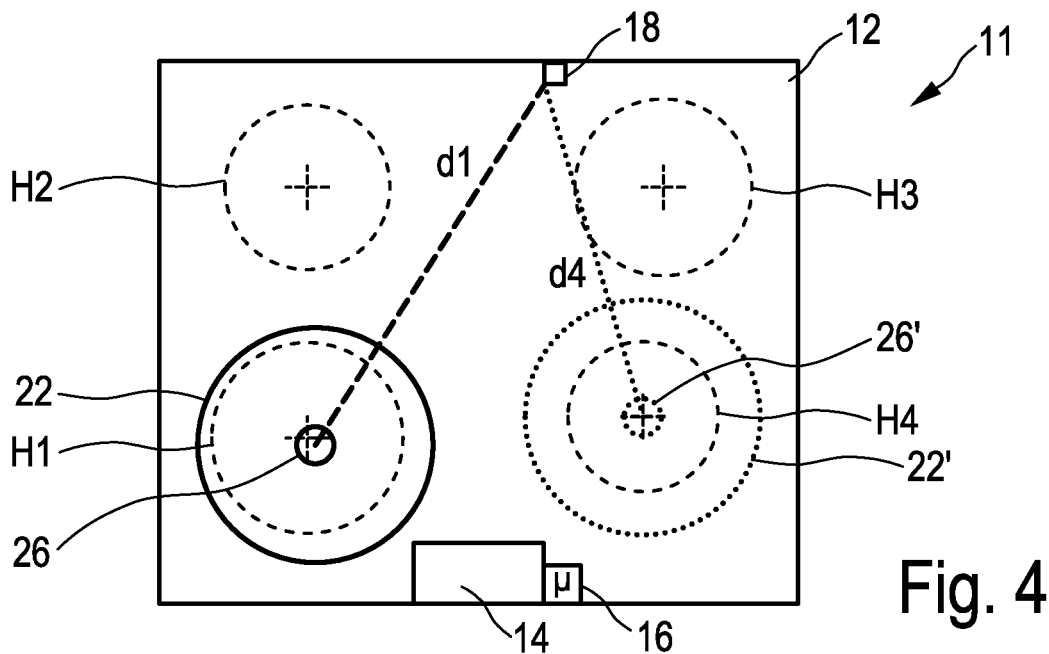
FIG. 4 shows the hob from FIG. 3 with a pan that has been put onto the front left induction heating coil, and also the pan in a second position over a different induction heating coil.

FIG. 4 depicts how the pan 22 has been put onto the hob plate 12 over the induction heating coil H1. From the comparison of the attachment module 26 with the center of the induction heating coil H1, it can be seen that the pan 22 is almost centrally over the latter and is just slightly displaced toward the bottom right, for example by 1 cm in practice. A distance measurement is then performed from the main connector 18 to the attachment module 26, which is representative of the pan 22 so to speak. This distance measurement is performed, as described previously, by means of BLE, in particular as a time-of-flight measurement, and it produces the distance d1. This distance d1 is then compared with the distances D1 to D4 of the induction heating coils H1 to H4 from the main connector 18 that are stored in the hob controller 16. In practice, it should be noted here that the distances D run almost horizontally, whereas the distances d between the main connector 18 and the attachment module 26 run at an upward slant so to speak. The attachment modules 26 on the top of the pans 22 are normally between 10 cm and 20 cm above the hob plate 12. An average value of approximately 15 cm can be assumed here, which is then set against the measured distance d1, or corrects said measured distance d1, using the known angle functions. The result is that the hob controller 16 connected to the main connector 18 establishes that not only has the induction heating coil H1 detected that any pan has been put on over it but that this is in fact a specific pan, namely the pan 22. The corrected value for the distance d1 will be relatively close to the stored distance D1, which means that it is verified that the pan 22 is situated over the induction heating coil H1. The attachment module 26 then sends an individual identifier identifying the pan provided therewith to the main connector 18, which said main connector receives with its receiver and forwards to the hob controller 16. Said hob controller then links the pan 22 with its individual identifier to its position over the front left induction heating coil H1. As such, temperature signals or other sensor signals from the attachment module 26 can be received from the main connector 18 and appropriately considered by the hob controller 16 in an aforementioned automatic program at the front left induction heating coil H1.

Advantageously, there can be provision here for the induction heating coil H1 to detect that a pan has been put on over it. Not only does it then forward this information to the hob controller 16, but the hob controller 16 then uses the main connector 18 to initiate the measurement of the distance d1. Previously, it can use a different signal to actually check whether the pan that has been put on over the induction heating coil H1 is one with an attachment module 26 or whether a new attachment module 26 has connected to the main connector 18.

The pan 22 could then also be moved, for example, as depicted in dots, to the right over the front right induction heating coil H4. The induction heating coil H1 thus no longer detects a pan over it, while at the same time the induction heating coil H4 detects a new pan over it. This could naturally also alternatively mean that the pan 22 has been removed from the hob 11 completely and a different pan has been put on over the induction heating coil H4. To establish this, the main connector 18 attempts to receive an identifier from an attachment module. If this happens, as here in the case of FIG. 4 with a signal from the attachment module 26' or an identifier, then it must now also be ensured that this received identifier also actually comes from a pan over the front right induction heating coil H4 at which the applicable attachment module 26 is situated. This is again done by measuring the distance, and the measured distance D4 between the main connector 18 and the attachment module 26, with the aforementioned average height correction, then corresponds to the distance D4 relatively well. The hob 11 or the hob controller 16 thus knows for certain that the pan 22 having the individual identifier that was previously over the front left induction heating coil H1 is now over the front right induction heating coil H4.

Figure 3:
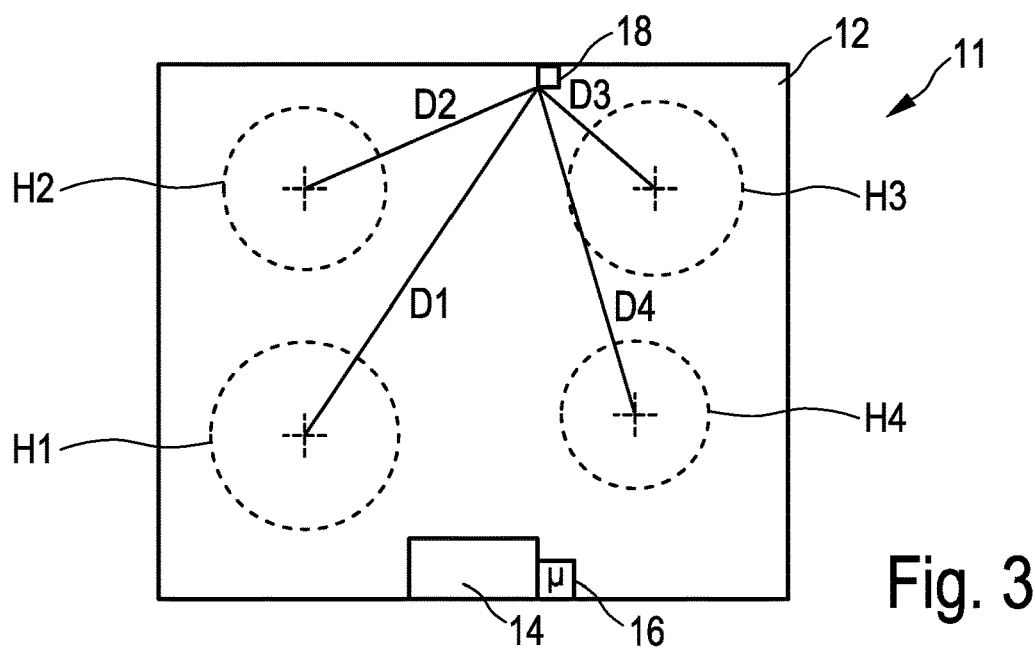
FIG. 3 shows the hob from FIG. 1 with an indication of the distances of the centers of the four induction heating coils from a main connector.

FIGS. 3 and 4 simultaneously reveal a problem with this embodiment of the invention. The distance between the main connector 18 and the attachment module 26' runs above the rear right induction heating coil H3 so to speak. If a pan has now been put on there, whether with or without an attachment module, then the direct and shortest radio connection is no longer without interference; this pan could interfere with or distort the distance measurement. It could therefore be that the distance measurement produces incorrect results. It is carried out either just with a single pan on the hob or with pan positions that cannot be blocked in the line to the main connector 18 by applicable pans that have been put onto the induction heating coil. This is probably not always possible, however. An arrangement of the main connector 18 in the central area of the hob 11 between the induction heating coils H1 to H4 is regarded as problematic, however, since there is no sure way of achieving sufficiently different distances D from the centers of the induction heating coils H1 to H4 or from pans having attachment modules that have been put on centrally above them, given the accuracy of a distance measurement by means of Bluetooth or by means of BLE that was mentioned at the outset. In addition, the radio signals would need to repeatedly pass through the lid and/or the pan wall, which means considerable risk and distortion of the measurement results.

Figure 5:
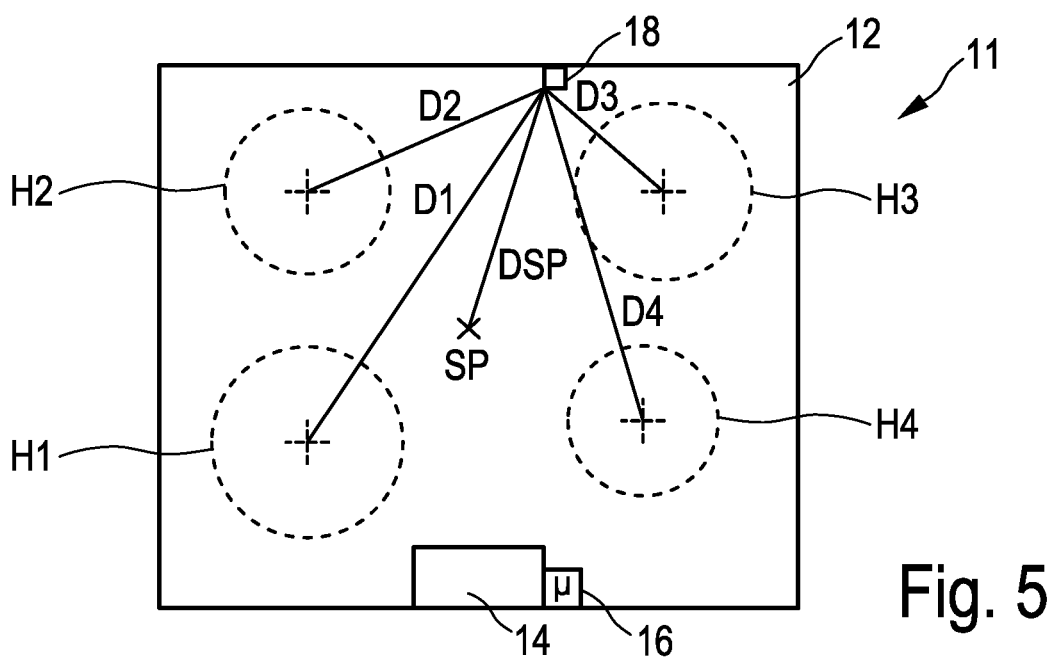
FIG. 5 shows a variation of the hob from FIG. 1 with a starting position situated in the center of the hob.

In addition, in a variant of the first configuration of the invention, which was also explained at the outset, a starting position SP on the hob plate 12 is defined as shown in FIG. 5. In the present case, it is defined as being precisely in the center of the hob 11; it should also be marked separately for the user, possibly using a switchable illumination. The distances D1 to D4 are again shown.

Figure 6:
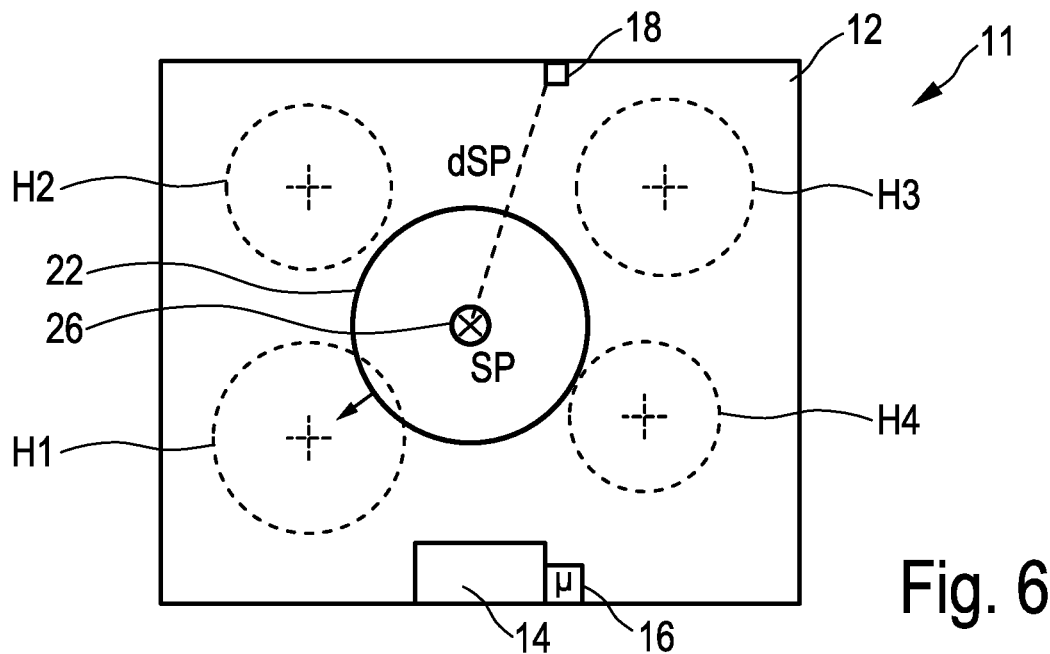
FIG. 6 shows the hob from FIG. 5 with a pan that has been put on centrally over the starting position.

According to FIG. 6, a pan 22 that is to be put on afresh is now placed centrally over the starting position or put onto the hob plate 12 such that the attachment module 26 is as centrally or vertically over the starting position SP as possible. It is now either possible for the main connector 18 to detect the sudden proximity of a pan having an attachment module; this may also have been enabled separately by a user after the pan has been put on. This alone is not necessarily certain enough, however, because a pan having an attachment module could also have been placed beside the hob 11 or the hob plate 12, but still very close and at a distance of less than D1 from the main connector 18, for example to the right of it, of course. It can also be seen that the induction heating coils H1 to H4 cannot work as a pan detection device as effectively here, since the overlap is too inaccurate. Therefore, there is advantageously provision here for a separate specific pan detection sensor, for example in inductive form, beneath the starting position SP. Said pan detection sensor detects that a pan 22 has been put on over it, as described previously, and then starts firstly the distance measurement and secondly the check on an identifier of the pan or of the associated attachment module.

The main connector 18 thus measures a distance dSP from the attachment module 26, specifically in corrected form as described previously. If this distance fairly matches the known distance DSP between the starting position SP and the main connector 18, then, together with the information that a pan has been detected over the starting position SP, it is assumed to be sufficiently certain to determine that the pan 22 having the attachment module 26 with the specific individual identifier, that is to say a now known pan 22, is at the starting position SP.

Figure 7:
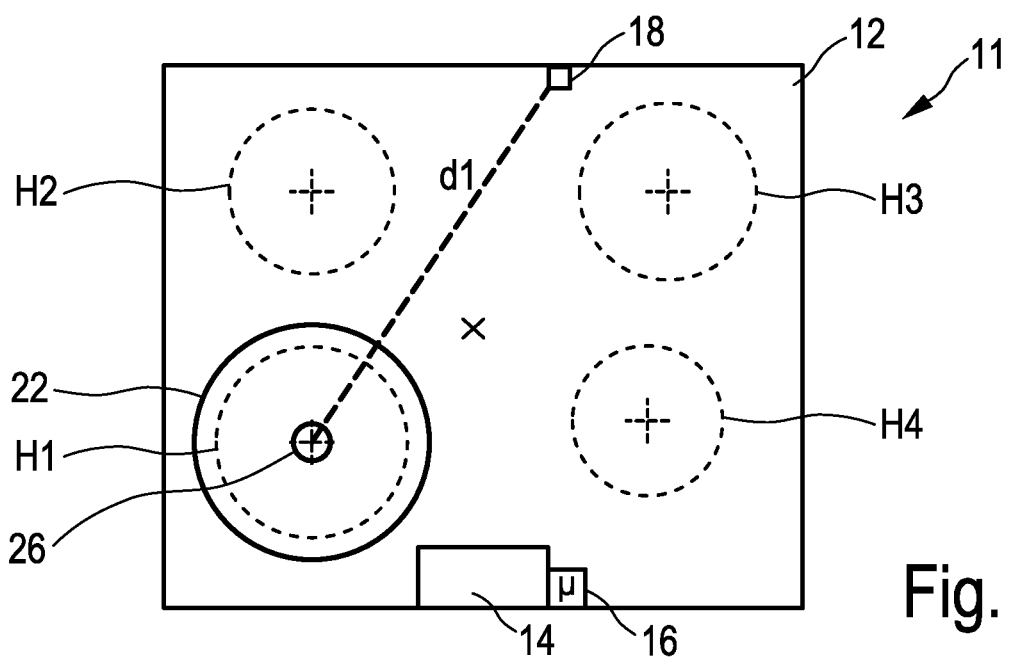
FIG. 7 shows the hob from FIG. 6, in which the pan, after having been detected, has been moved to the front left induction heating coil.

According to FIG. 7, the pan 22 is now moved from the starting position SP to its heating position above the front left induction heating coil H1. Firstly, the induction heating coil H1 detects this itself by way of its pan detection function together with the hob controller 16. In addition, for safety, a distance measurement from the main connector 18 to the attachment module 26 is performed again. The distance d1 measured in the process fairly matches the known distance D1, or the difference is very small, which means that the hob controller 16 can assume with certainty that the pan 22 with the separate identifier is now on the front left induction heating coil H1. An automatic program can be carried out there by the hob controller 16.

On the basis of the description together with FIGS. 5 to 7, it is easy to imagine that it is thus also very easy to use further pans having an attachment module, as described here, on the hob 11. This is because a next pan can be put on above the starting position SP again and detected with certainty and then moved or positioned over a different induction heating coil H2 to H4 for heating.

Figure 8:
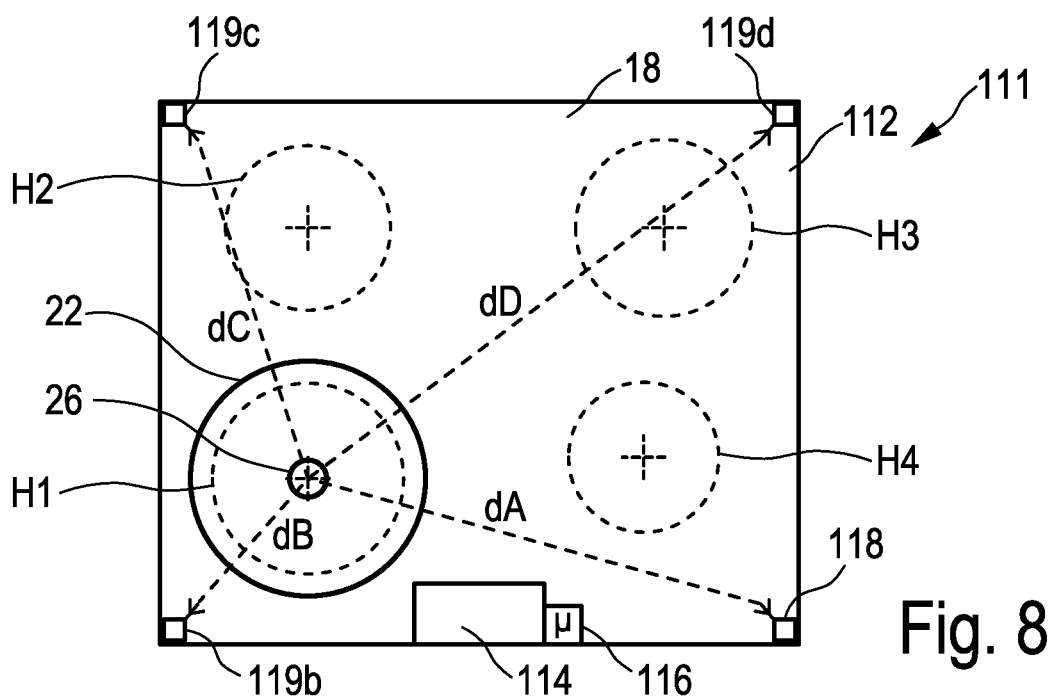
FIG. 8 shows a second configuration of a hob similar to FIG. 1 with four connectors close to the corners of the hob and a pan that has been put on over the front left induction heating coil.
Figure 9:
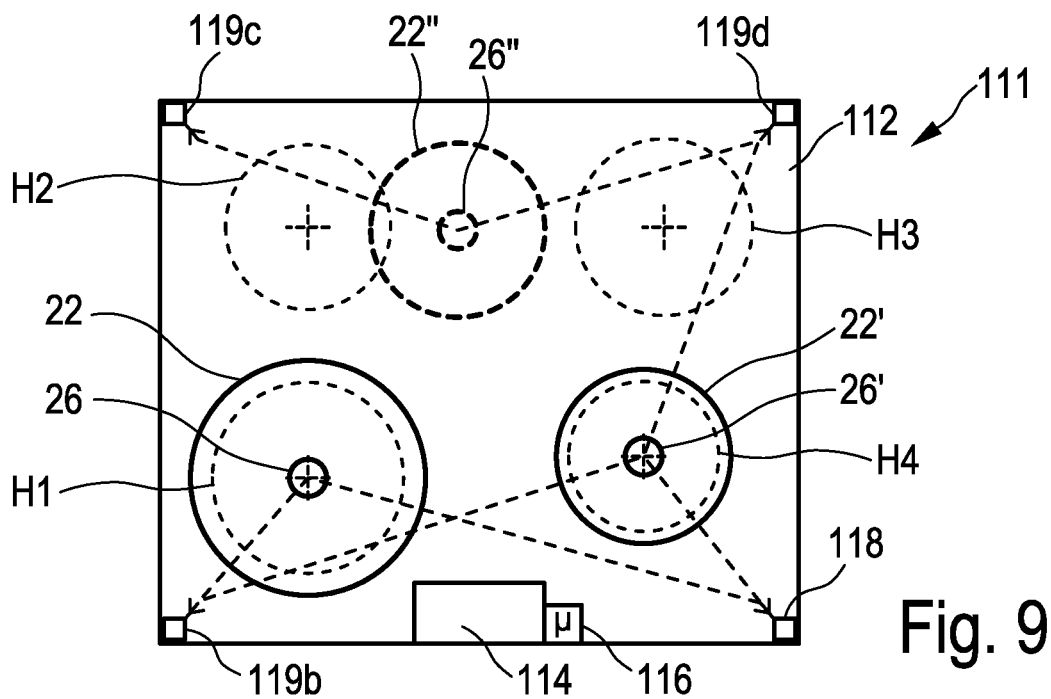
FIG. 9 shows the hob from FIG. 8 with a further pan that has been put on and a possible pan position depicted in dashed lines.

FIGS. 8 and 9 depict a second previously explained configuration of the invention. The hob 111 depicted here with a hob plate 112, an operator control device 114 and a hob controller 116 together with four induction heating coils H1 to H4 has a main connector 118 in the front right corner. This can be in exactly the same form as the main connector 18 in FIGS. 1 to 7. Additional connectors 119 are arranged in the other three corners. These can be identical to the main connector 118 in terms of design or hardware, but provided or actuated with different functions. Alternatively, they can also be in simpler form, namely just for distance measurement and not also for communication or for receiving an individual identifier of a pan or its attachment module.

A pan 22 in accordance with the previous figures having an attachment module 26 is now put onto the hob plate 12 over the front left induction heating coil H1, specifically fairly centrally, by a user. The induction heating coil H1 as pan detector detects this together with the hob controller 116, as described previously, and starts the method according to the invention. The main connector 118 at the front right then transmits a signal in order to check whether a pan having such an attachment module can be identified nearby. This is naturally the case with the pan 22 having the attachment module 26. However, it is now also necessary to check whether the pan 22 having the attachment module 26 and the applicable individual identifier has actually been put over the induction heating coil H1. To this end, a respective distance measurement is carried out not only between the main connector 118 and the attachment module 26 but also in relation to the three additional connectors 119*b* to 119*d*. This produces the respective distances dA, dB, dC and dD. It would now certainly be possible to repeatedly check whether these measured distances match known distances from the center of the induction heating coil H1. However, if there are multiple pans on the hob plate 112, in particular also over the induction heating coils H3 and H2, then it is obvious that they would greatly interfere with a distance measurement by means of reflection. Therefore, it makes sense for only one distance measurement with the main connector 118 and the additional connector 119*b* to be carried out here. In a first variant, this can be compared with the known distances of the center of the induction heating coil H1 from these two connectors. The result here is very clear, namely that the pan 22 having the attachment module 26 has been put on above the induction heating coil H1 and, as explained previously, the hob controller 116 can now carry out an automatic program therewith.

However, in order to be able to carry out the method even for a hob that does not just have individual and separated and spaced induction heating coils but rather is a so-called surface area hob having a multiplicity of heating devices very close together covering the fundamental hob plate 112 area, it can be desirable to determine the position of the attachment module 26 as accurately as possible. Information about the size of the associated pan 22 can be included in the identifier thereof.

For this purpose, the distances dA and dB from the attachment module 26 to the main connector 118 and to the additional connector 119*b* are measured. These can then be used to calculate the precise place at which the pan 22 has been put on by means of trigonometry and on the basis of the known distance of the two connectors 118 and 119*b* from one another. On the basis of the known size of the pan 22, applicable and an applicable number of the multiple heating devices of the hob 11 can then be activated by the hob controller 116 in order to heat the pan 22 as desired.

FIG. 9 depicts how another pan 22' having attachment module 26' has now been put on over the front right induction heating coil H4. This action of putting on the pan has been detected; in addition, the main connector 118 has detected that another pan having an attachment module has been put on in addition to the pan 22 already present and detected. Since it must be assumed that this is over the induction heating coil H4 or at least in the front right area, and the distance measurement from the additional connector 119b to the attachment module 26' could be interfered with by the pan 22, the pan controller 116 takes the rear right additional connector 119d for the distance measurement instead. This is because it knows that a pan has not been put on in the rear right area or over the induction heating coil H3. It is now also again possible, as described previously, to verify the positioning of the pan 22' having attachment module 26' over the front right induction heating coil H4 or else to calculate the precise location at which said pan has been put on.

Depicted in dashes at the rear is a pan 22" having an attachment module 26" that, similarly to in the case of FIG. 6, cannot be detected accurately in terms of its being put onto the hob plate 112. The main connector 118 here can also again detect the presence of a pan having an attachment module in general, however; this may also be detected by a pan detection device. Since the two pans 22 and 22' are known to already be in the front area of the hob 111, the pan 22" is presumed to be in the rear area. The two rear additional connectors 119c and 119d therefore ascertain their respective distances dC and dD from the attachment module 26". These can be used to calculate the precise position thereof, and the applicable individual identifier is received by the main connector 118 and forwarded to the hob controller 116. It is therefore also possible for the pan 22" to be heated, as described previously, provided that it is positioned sufficiently over one of the induction heating coils or another heating device of the hob 111.

Figure 10:
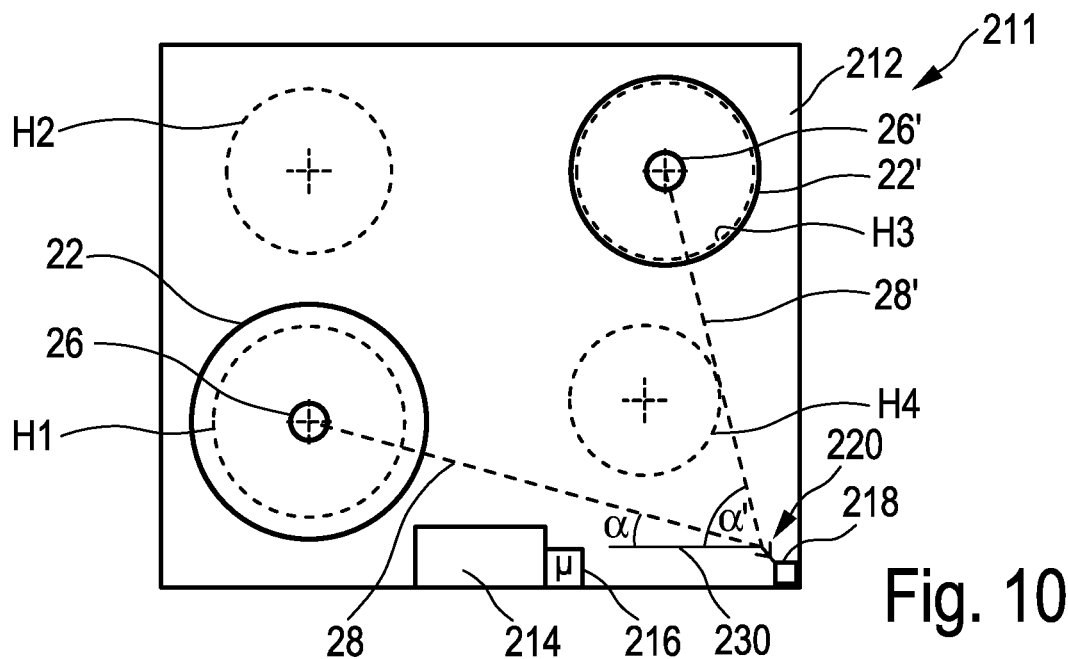
FIG. 10 shows a third configuration of a hob similar to FIG. 1 with a main connector that can ascertain the angle of a signal from the remote communication device of a pan in relation to the main connector.

FIG. 10 shows a hob 211 with a hob plate 212, four induction heating coils H1 to H4, an operator control device 214 and a hob controller 216. Arranged in the front right corner is a main connector 218 that has an antenna 220, which is aimed in the direction of the hob plate 212 or the induction heating coils H1 to H4 so to speak. The antenna 220 is designed such that, as explained at the outset, it can ascertain an angle in relation to a signal or a signal line 28, depicted in dashes, from a remote communication device in an attachment module 26 of the pan 22 over the induction heating coil H1 to the main connector 218. This is the so-called angle-of-arrival technology. The angle α between the signal line 28 and a baseline 230, which, by way of illustration, runs parallel to the front edge of the hob 211, can therefore be determined. As such, the fixed arrangement of the main connector 218 or possibly also an additional communication device, if this were present, allows the angle α to be determined. It is then possible to use geometry, together with the aforementioned distance measurement, to calculate precisely where the remote communication device and therefore the associated pan 22 has been put onto the hob plate 212.

Another pan 22', having a remote communication device in an attachment module 26', in relation to which the antenna 220 is at an angle α', has been put on over the induction heating coil H3. The applicable aforementioned distance measurement can then also be used to determine the position of said attachment module on the hob plate 212.

Figure 11:
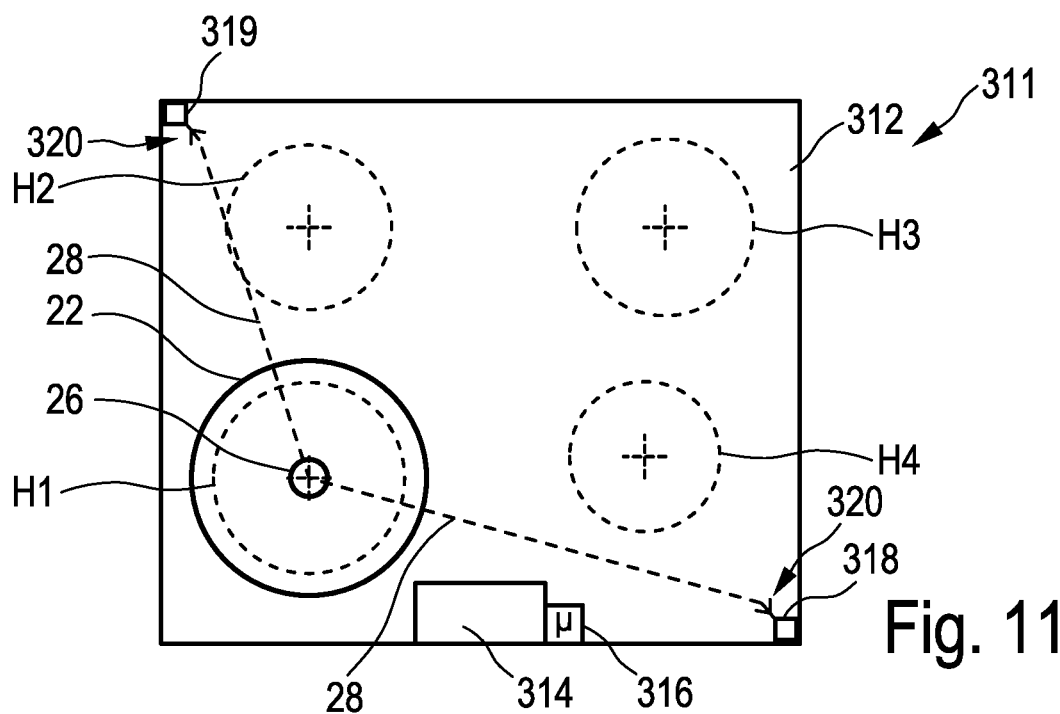
FIG. 11 shows a fourth configuration of a hob with a main connector that can address a remote communication device of a pan with an antenna in a certain spatial direction.

FIG. 11 shows a hob 311 with a hob plate 312, four induction heating coils H1 to H4, an operator control device 314 and a hob controller 316. Arranged in the front right corner is a main connector 318 that has an antenna 320, which is aimed in the direction of the hob plate 312 or the induction heating coils H1 to H4 so to speak. The antenna 320 is designed such that, as explained at the outset, it is able, alone or by means of multiple further antennas, to address the remote communication device of the pan 22 in a predefined spatial direction in a predefined period at a variable signal strength. The signal line 28, depicted in dashes, from a remote communication device in an attachment module 26 of the pan 22 over the induction heating coil H1 to the main connector 318 corresponds to one of these spatial directions. As such, the main connector 318 knows or can determine the direction or spatial direction that the remote communication device is in. A distinction can be drawn between multiple remote communication devices by means of the variable signal strength, as a result of which the direction or spatial direction of each of these multiple remote communication devices can also be determined. The applicable aforementioned distance measurement can then also be used to determine the respective position thereof on the hob plate 312.

At the top left, the hob 311 has an additional connector 319 having an antenna 320, which is designed in accordance with the antenna 320 of the main connector 318, advantageously in exactly the same way. The additional connector 319 with its antenna 320 likewise addresses the remote communication device of the pan 22 in a predefined spatial direction in a predefined period at a variable signal strength. As such, the same determination of the respective position of said remote communication device on the hob plate 312 can take place. This allows the result of the position determination of the main connector 318 for the pan 22 to be checked or refined.

The invention claimed is:

1. A method for determining a pan position of a pan on a hob, said pan having a communication device, said hob having:
   - a hob plate for putting said pan on,
   - at least two heating devices being arranged beside one another under said hob plate,
   - a hob controller,
   - a main communication device, wherein said main communication device:
     - has a transmitter and a receiver designed to communicate with said pan,
     - is designed to measure a distance between itself and a remote communication device of said pan,
     - is designed to use a wireless communication protocol,
     - is designed to receive an individual identifier of said remote communication device and to store said individual identifier in said hob controller,
     - belongs to said hob controller or is controlled by said hob controller, said method comprising:
   - detecting said pan as being put on or present on said hob plate when said hob and said main communication device are switched on and said pan having said remote communication device is put onto said hob plate,
   - after said pan has been detected as being present or put on said hob plate, measuring said distance between said main communication device and said remote communication device of said pan,
   - determining, based on said measured distance between said main communication device and said remote communication device, said pan position of said pan on said hob, and
   - storing said determined pan position together with said individual identifier of said remote communication device in said hob controller.

2. The method as claimed in claim 1, wherein said remote communication device of said pan is at a distance of less than 2 cm from a surface center of a contact surface of said pan on said hob plate in a direction of a projection from above.

3. The method as claimed in claim 1, wherein said distance between said main communication device and said remote communication device is measured by means of Bluetooth or by means of ultra-wideband radio.

4. The method as claimed in claim 3, wherein said measuring of said distance between said main communication device and said remote communication device is made by using a time-of-flight measurement for a signal from said main communication device to said remote communication device and from said remote communication device back to said main communication device being carried out.

5. The method as claimed in claim 1, wherein said pan having said remote communication device is detected as being present or put on said hob plate by pan detection sensors and said hob plate or by pan detection means integrated in said heating devices.

6. The method as claimed in claim 5, wherein said method for determining said pan position is started by said pan being detected as being present or put on said hob plate.

7. The method as claimed in claim 1, wherein
said heating devices are at a distance of at least 4 cm from one another,
a distance of each center of each said heating device from said main communication device is known and is different for each said heating device,
said measured distance between said main communication device and said remote communication device is compared with said known distances of said centers of said heating devices from said main communication device, and
said pan is regarded as positioned on said heating device for which said distance of its center from said main communication device has a least difference in relation to a distance between said main communication device and said remote communication device.

8. The method as claimed in claim 7, wherein said hob has four, six or eight said heating devices.

9. The method as claimed in claim 7, wherein said method is performed only if just a single said pan having said remote communication device is positioned on said hob, said pan detection device being used to detect whether just a single pan is positioned on said hob, and only in said case said method for determining said pan position is carried out.

10. The method as claimed in claim 7, wherein a specific starting position for said pan having said remote communication device to be put on is defined on said hob plate, a comparison of a known distance of said starting position from said main communication device with a result of said distance measurement between said remote communication device and said main communication device being performed in order to confirm that said pan has been put onto said starting position correctly,
wherein the method further comprises:
detecting, by said pan detection device, a new pan position to which said pan having said remote communication device has been moved when said pan having said remote communication device is moved to said new pan position that a user desires on said hob plate.

11. The method as claimed in claim 10, wherein a plausibility check is being carried out with a distance of said remote communication device from said main communication device on a basis of a known distance of said heating device belonging to said new pan position from said main communication device.

12. The method as claimed in claim 1, wherein
multiple additional communication devices are arranged in said hob under said hob plate, said additional communication devices being designed to measure distance in a same way as said main communication device, and
said distance of said remote communication device from said main communication device and additionally from at least one of said additional communication devices, is determined and this is used to calculate said pan position on said hob plate given said known position of said additional communication devices in said hob.

13. The method as claimed in claim 12, wherein a total of at least two said additional communication devices are arranged in said hob, said distance measurements of which communication devices from said remote communication device of said pan are used to determine said pan position.

14. The method as claimed in claim 12, wherein said main communication device is designed to ascertain a direction or an angle of a signal from said remote communication device of said pan in relation to said main communication device.

15. The method as claimed in claim 12, wherein said main communication device is designed to use one or more antennas to address said remote communication device in a predefined spatial direction in a predefined period at a variable signal strength.

16. The method as claimed in claim 12, wherein said hob housing is square comprising four corners and wherein said main communication device or said additional communication devices of said hob are at a distance of less than 5 cm from said four corners of said hob housing under said hob plate.

17. The method as claimed in claim 12, wherein multiple said pans each having a remote communication device are positioned on said hob plate, said pan positions thereof being determined in succession, beginning with said pan having been detected as being present or put onto said hob plate first.

18. The method as claimed in claim 17, wherein during said determination of said pan position of a specific pan having said remote communication device, said other remote communication devices of said other pans do not participate in said distance measurement.

19. The method as claimed in claim 1, wherein a further step involves one said heating device over which said pan has been detected or has been determined to be positioned producing a specific pattern of heating power with variation of time and/or a level of said heating power, and said pattern being compared with a temperature measurement at said pan, wherein if said pattern of said temperature detection at said pan does not match said pattern of said production of said heating power at said heating device over which said pan has been determined to be positioned, said pan position of said pan is assumed to be unknown and if necessary a user is asked to determine said pan position again.

20. The method as claimed in claim 1, wherein said pan is detected as being put on or present on said hob plate by way of a pan detection device arranged at said heating device or by means of said heating device itself.

21. A hob designed to carry out said method as claimed in claim 1, said hob having:
a hob plate for putting said pan on,
multiple said heating devices arranged one beside another under said hob plate,
a hob controller,
a main communication device that:
has a transmitter and a receiver designed to communicate with one said pan having a remote communication device, is designed to measure a distance between itself and said remote communication device of said pan, is designed to use a wireless communication protocol, is designed to receive an individual identifier of said remote communication device and to store said individual identifier in said hob controller, belongs to said hob controller and is controlled by said hob controller, a pan detection device for detecting said pan as being present or put on said hob plate, and a memory in said hob controller for storing said individual identifier of said remote communication device.

\* \* \* \* \*